US011494238B2

(12) United States Patent
Park et al.

(10) Patent No.: US 11,494,238 B2
(45) Date of Patent: Nov. 8, 2022

(54) RUN-TIME NEURAL NETWORK RE-ALLOCATION ACROSS HETEROGENEOUS PROCESSORS

(71) Applicant: QUALCOMM INCORPORATED, San Diego, CA (US)

(72) Inventors: Hee Jun Park, San Diego, CA (US); Wilson Kwan, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 731 days.

(21) Appl. No.: 16/506,913

(22) Filed: Jul. 9, 2019

(65) Prior Publication Data
US 2021/0012207 A1    Jan. 14, 2021

(51) Int. Cl.
*G06F 9/50* (2006.01)

(52) U.S. Cl.
CPC ............ *G06F 9/505* (2013.01); *G06F 9/5088* (2013.01)

(58) Field of Classification Search
CPC ........ G06N 3/10; G06N 3/0454; G06N 3/063; G06N 3/08; G06F 9/505; G06F 9/5088
See application file for complete search history.

(56) References Cited

U.S. PATENT DOCUMENTS

2014/0115363 A1* 4/2014 Tu ........................... G06F 1/329
                                                                  713/323
2016/0210550 A1* 7/2016 Merrill ................. G06N 3/0454

* cited by examiner

*Primary Examiner* — Sisley N Kim
(74) *Attorney, Agent, or Firm* — Smith Tempel Blaha LLC/Qualcomm

(57) ABSTRACT

Neural network workload re-allocation in a system-on-chip having multiple heterogenous processors executing one or more neural network units may be based on measurements associated with the processors' conditions and on metadata associated with the neural network units. Metadata may be contained in an input file along with neural network information. Measurements characterizing operation of the processors may be obtained and compared with one or more thresholds. A neural network unit executing on a processor may be identified as a candidate for re-allocation based on metadata associated with the neural network unit and results of the comparisons. A target processor may be identified based on the metadata and results of the comparisons, and the candidate neural network neural network unit may be re-allocated to the target processor.

30 Claims, 10 Drawing Sheets

RUN-TIME NEURAL NETWORK RE-ALLOCATION ACROSS HETEROGENEOUS PROCESSORS

DESCRIPTION OF THE RELATED ART

A "system on a chip" or "SoC" integrates numerous components to provide system-level functionality. For example, an SoC may include a modem that provides wireless connectivity, and one or more types of processors such as central processing units ("CPUs"), graphics processing units ("GPUs"), digital signal processors ("DSPs"), and neural processing units ("NPUs").

Neural networks are increasingly employed in processing environments that address real-time, dynamic, and often safety-critical scenarios, such as automotive environments. Neural network software may be configured to execute or run on a selected one of a number of SoC processor types. Typically, the developer of the neural network software determines on which type of processor the software is to run and configures the software accordingly. In an SoC having an NPU, neural network software may be configured to run on the NPU or, alternatively, configured in a different manner to run on a different type of processor, such as a DSP.

Performance is an important consideration in processing environments of the type noted above, as excessive processing latency may compromise safety. Thermal mitigation is another important consideration in such environments because uncontrolled heat dissipation can damage components, reduce performance, harm users, or otherwise cause undesirable effects. Thermal mitigation techniques include throttling or reducing processor voltage and/or frequency in response to a measured temperature increase, at a tradeoff of decreased performance. It would be desirable to dynamically allocate workloads in a manner that may help minimize adverse thermal effects as well as adverse effects upon performance.

SUMMARY OF THE DISCLOSURE

Systems, methods and computer program products are disclosed for run-time workload re-allocation in a system-on-a-chip ("SoC") having a plurality of heterogeneous processors.

An exemplary method for workload re-allocation in an SoC may include: obtaining a plurality of measurements, each characterizing operation of each of the SoC processors; comparing each of the measurements with one or more thresholds; identifying a neural network unit executing on one of the processors based on metadata associated with the neural network unit and based on a result of a comparison of the measurements with the one or more thresholds; identifying a target processor based on the metadata associated with the neural network unit and based on a result of the comparison; and migrating the neural network unit to the target processor.

An exemplary system for workload re-allocation in an SoC may include: a plurality of heterogeneous SoC processors and a workload allocation control processor. The workload allocation control processor may be configured to: obtain a plurality of measurements, each characterizing operation of each of the SoC processors; compare each of the measurements with one or more thresholds; identify a neural network unit executing on one of the SoC processors based on metadata associated with the neural network unit and based on a result of a comparison of the measurements with the one or more thresholds; identify a target processor based on the metadata associated with the neural network unit and based on a result of the comparison; and migrate the neural network unit to the target processor.

Another exemplary system for workload re-allocation in an SoC may include: means for obtaining a plurality of measurements, each characterizing operation of each of the SoC processors; means for comparing each of the measurements with one or more thresholds; means for identifying a neural network unit executing on one of the SoC processors based on metadata associated with the neural network unit and based on a result of a comparison of the measurements with the one or more thresholds; means for identifying a target processor based on the metadata associated with the neural network unit and based on a result of the comparison; and means for migrating the neural network unit to the target processor.

An exemplary computer program product workload re-allocation in an SoC may include a non-transitory computer-readable medium having stored thereon in computer-executable form instructions executable on a processor system to: obtain a plurality of measurements, each characterizing operation of each of the SoC processors; compare each of the measurements with one or more thresholds; identify a neural network unit executing on one of the SoC processors based on metadata associated with the neural network unit and based on a result of a comparison of the measurements with the one or more thresholds; identify a target processor based on the metadata associated with the neural network unit and based on a result of the comparison; and migrate the neural network unit to the target processor.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

The term "core" is used herein to refer to a block of functionally related hardware components associated with one or more processors. A processor, such as a CPU, GPU, DSP, NPU, etc., or such a processor and its related hardware components, may be referred to as a core. The term "heterogeneous" may be used to describe cores such as a CPU, GPU, DSP, and NPU with respect to each other because they are functionally different. In contrast, a "multi-core" processor (e.g., multi-core CPU) has multiple processing cores that are essentially functionally identical to each other, i.e., homogeneous in type. A multi-core processor may have cores that differ from each other in processing power but are otherwise functionally similar or homogeneous. Exemplary embodiments disclosed herein relate to systems having heterogeneous cores or processors.

Figure 1:
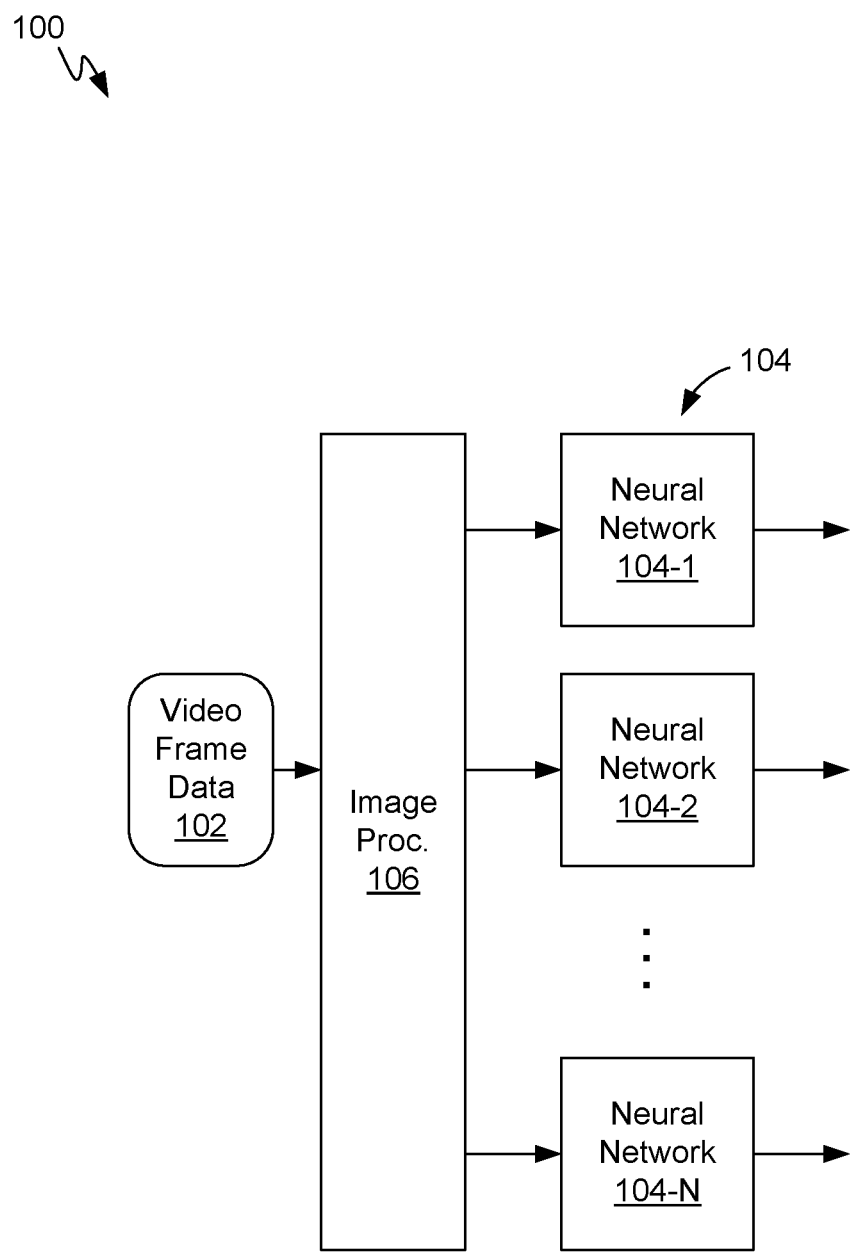
FIG. 1 is a data flow diagram illustrating processing video data by a plurality of neural networks operating concurrently with each other.

FIG. 1 illustrates a system 100 in which video frame data 102 is processed using a plurality of concurrently operating neural networks 104. The system 100 may be integrated with, for example, a vehicle such as an automobile (not shown). After the raw video frame data 102 is pre-processed using conventional image processing 106, the frame data is operated upon by the neural networks 104. The video frame data 102 may comprise images of, for example, a driver's face. The neural networks 104 may include a first neural network 104-1 directed to, for example, facial recognition of the driver, a second neural network 104-2 directed to, for example, detecting the driver yawning, etc., through an Nth neural network 104-N. There may be any number N of neural networks 104 operating concurrently or in parallel with each other. The foregoing are intended only as examples of types of neural networks 104 and an environment (e.g., automotive) in which it may be desirable for neural networks 104 to operate concurrently with each other. More generally, the system 100 represents an example of an environment in which performance, thermal energy mitigation, and other constraints may be significant.

Conventionally, such neural networks 104, image processing 106, etc., may execute concurrently on a corresponding group of two or more processors (not shown in FIG. 1). The processors generate thermal energy as a result of such processing. The thermal energy may be concentrated in regions of a system-on-a-chip ("SoC") in which the processors are located. The concentrated regions of thermal energy may have undesirable effects unless sufficient thermal mitigation techniques are employed to control thermal energy generation or dissipation. Conventional thermal mitigation techniques include throttling the operating frequency or voltage of the processors when it is determined that a measured temperature has exceeded a threshold. However, reducing frequency and voltage may reduce the performance (e.g., reduce speed, increase latency, etc.) of the neural networks 104. In a safety-critical environment, such as an automotive environment, it is generally undesirable to reduce the performance of the neural networks 104. The exemplary systems, methods and computer program products disclosed herein may help avoid localized regions of excessive thermal energy on a chip while also avoiding reducing the performance of concurrently executing neural networks 104 or other concurrently executing neural network units.

Figure 2:
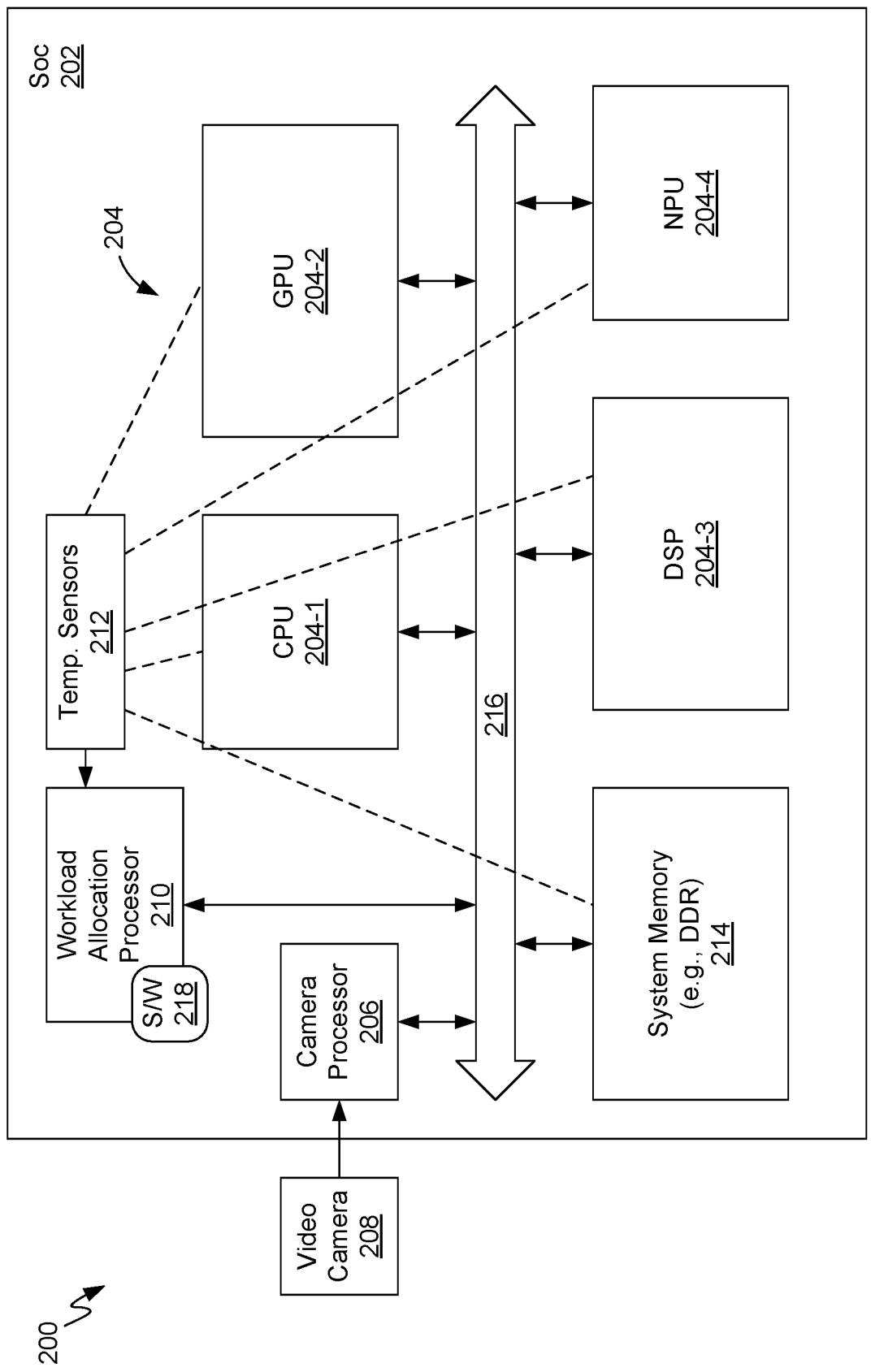
FIG. 2 is a block diagram of a system for workload re-allocation in a system-on-chip ("SoC"), in accordance with exemplary embodiments.

FIG. 2 illustrates an exemplary system 200 that includes an SoC 202 having a number of cores or processors 204. The processors 204 may be of different types (i.e., heterogeneous), such as a CPU 204-1, a GPU 204-2, a DSP 204-3, an NPU 204-4, etc. The SoC 202 may further include a video camera processor 206 that receives and processes the aforementioned video frame data 102 (FIG. 1) from one or more video cameras 208. The SoC 202 may also include a workload allocation processor 210 and temperature sensors 212. The SoC 202 may further include one or more memories, such as a system memory 214. The system memory 214 may comprise, for example, double data-rate dynamic random access memory ("DDR-DRAM"). A data interconnect 216, such as one or more busses, may be configured to enable data communication among the processors 204, 206 and 210, system memory 214, and other components of the SoC 202.

Each of the temperature sensors 212 may be thermally coupled to one of the processors 204 and configured to measure a temperature that characterizes the heat dissipated by the associated processor 204 as a result of its operation. The workload allocation processor 210 may gather or read the temperature measurements from the temperature sensors 212. The workload allocation processor 210 may operate under the control of software 218 (or firmware, etc.). The software 218 is conceptually illustrated in FIG. 2 for purposes of clarity, but as understood by one of ordinary skill in the art, may be stored in one or more (volatile or non-volatile) memories, such as the system memory 214 for execution by the workload allocation processor 210 in accordance with conventional computing principles. Execution of the software 218 may configure the workload allocation processor 210 to control the methods described below. Further, the various processors 204, 206 and 210 may utilize the system memory 214 for storing data, such as results of computations, and may also include internal memories for such purposes. Although not shown for purposes of clarity, the SoC 202 may be coupled to one or more external memories and other components, such as, for example, an interface for alerting a driver of conditions determined by the processors 204.

Figure 3:
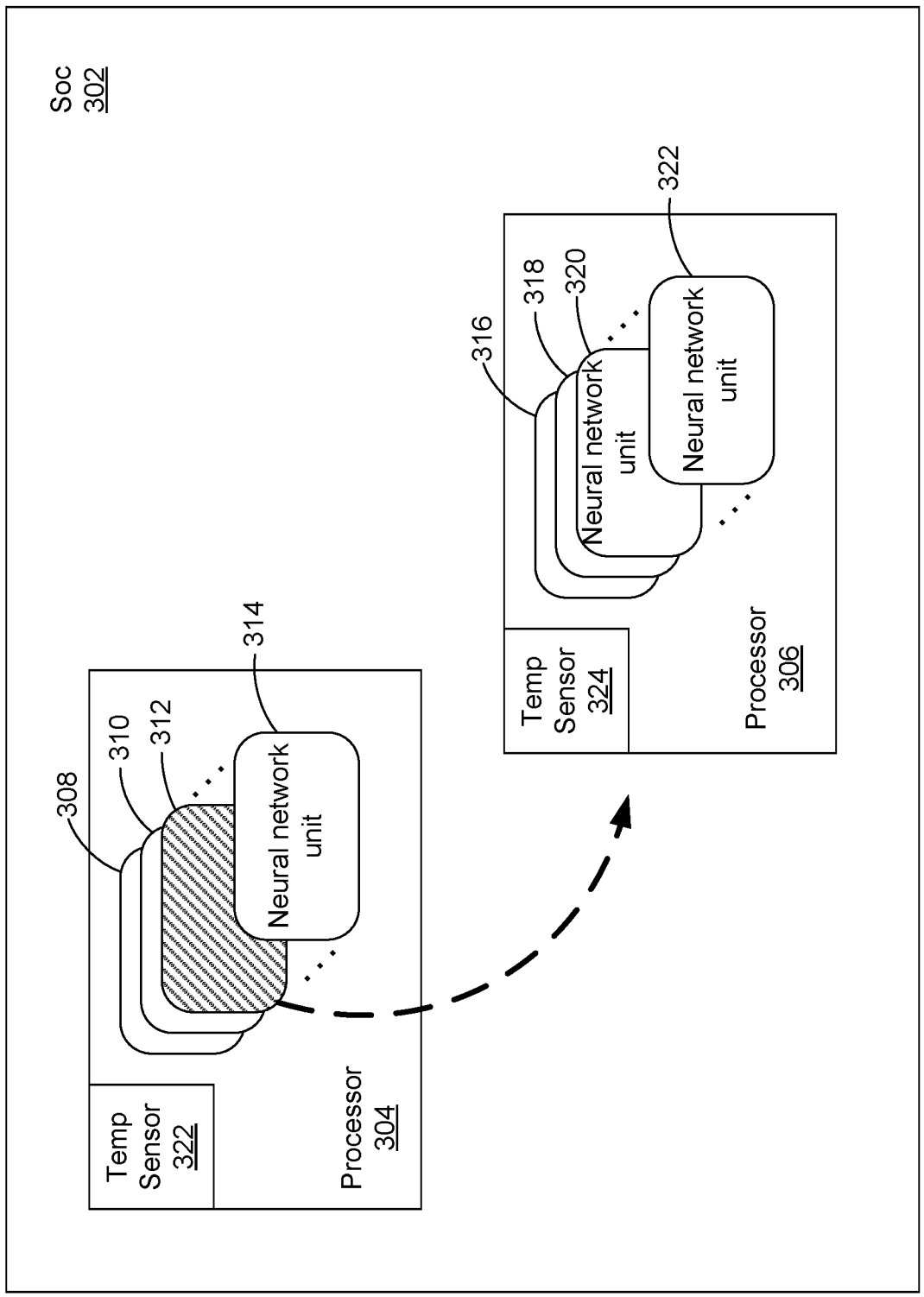
FIG. 3 conceptually illustrates re-allocation of a neural network unit from one processor of an SoC to another, in accordance with exemplary embodiments.

FIG. 3 illustrates an SoC 302 having at least a first processor 304 and a second processor 306. The SoC 302 may be an example of the above-described SoC 202 (FIG. 2). Thus, each of processors 304 and 306 may be any of the above-described processors 204 or other processors. Although only two such processors 304 and 306 are shown in FIG. 3 for purposes of illustration, the SoC 302 may have more than two processors, each operating in a manner similar to that of processors 304 and 306.

In an example of operation, one or more neural network units 308, 310, 312, 314, etc., may be executing concurrently with each other on the first processor 304, while one or more other neural network units 316, 318, 320, 322, etc., may be executing concurrently with each other on the second processor 306 (and concurrently with the neural network units 308, 310, 312, 314, etc.). Although only the neural network units 308-322 and processors 304-306 are shown for purposes of clarity, there may be any number of such neural network units executing on either of processors 304 and 306 or additional processors. In other examples of operation, there may be more or fewer neural network units than shown in FIG. 3. It may be noted that although the processors 304 and 306 are heterogeneous, either of the processors 304 and 306 is capable of executing any of the neural network units 308-322.

Each of the exemplary neural network units 308-322 may be, for example, a neural network. Alternatively, or in addition, some or all of the neural network units 308-322 may be layers of the same neural network. As understood by one of ordinary skill in the art, a neural network may comprise any number of layers. As the term "layer" in the context of a neural network is well understood by one of ordinary skill in the art, this aspect is not described in further detail herein. More generally, conventional architectural and operational principles of neural networks are not described herein. Nevertheless, it may be noted that inputs of a neural network layer may be configured to receive data from the outputs of an adjacent neural network layer. That is, data flows among the layers in accordance with the particular neural network's architecture.

Different layers of the same neural network may be executed by different processors 304, 306, etc., and the processors may communicate the inputs and outputs of the layers among them (e.g., via the interconnect 216) in accordance with the neural network's architecture. In this manner, a neural network distributed over a plurality of processors 304, 306, etc., may function as though it were executed by a single processor.

A first temperature sensor 322 may be configured to measure a temperature of the first processor 304. A second temperature sensor 324 may be configured to measure a temperature of the second processor 306. The temperature sensors 322 and 324 may be examples of the above-described temperature sensors 212 (FIG. 2). The workload allocation processor 210 (FIG. 2) may be configured to receive temperature measurements from the temperature sensors 322 and 324. The workload allocation processor 210 also may be configured to perform or control the methods disclosed herein based on the temperature measurements and on metadata associated with the neural network units 308-322.

As described below in further detail, if a measured temperature associated with an SoC processor, such as processor 304 or 306, exceeds a threshold, the workload allocation processor 210 may identify a neural network unit to re-allocate or migrate from that processor to another processor. The workload allocation processor 210 may accordingly identify another one of the SoC processors as a target processor to receive the re-allocated or migrated neural network unit. In the example illustrated in FIGS. 3-4, the workload allocation processor 210 may determine that the measured temperature associated with the first processor 304 exceeds a threshold. Based on such a determination, the workload allocation processor 210 may identify the neural network unit 312 that is executing on the first processor 304 (from among all the neural network units executing on the first processor 304) as a candidate for re-allocation. The identification of the neural network unit 312 as a candidate for re-allocation may be based on metadata associated with the neural network unit 312. The workload allocation processor 210 still further may identify the second processor 306 (from among all the SoC processors) as a target for executing the candidate neural network unit instead of the first processor 304. The identification of the second processor 306 as a target to which the neural network unit 312 is to be re-allocated may be based on metadata associated with the neural network unit 312.

Figure 4:
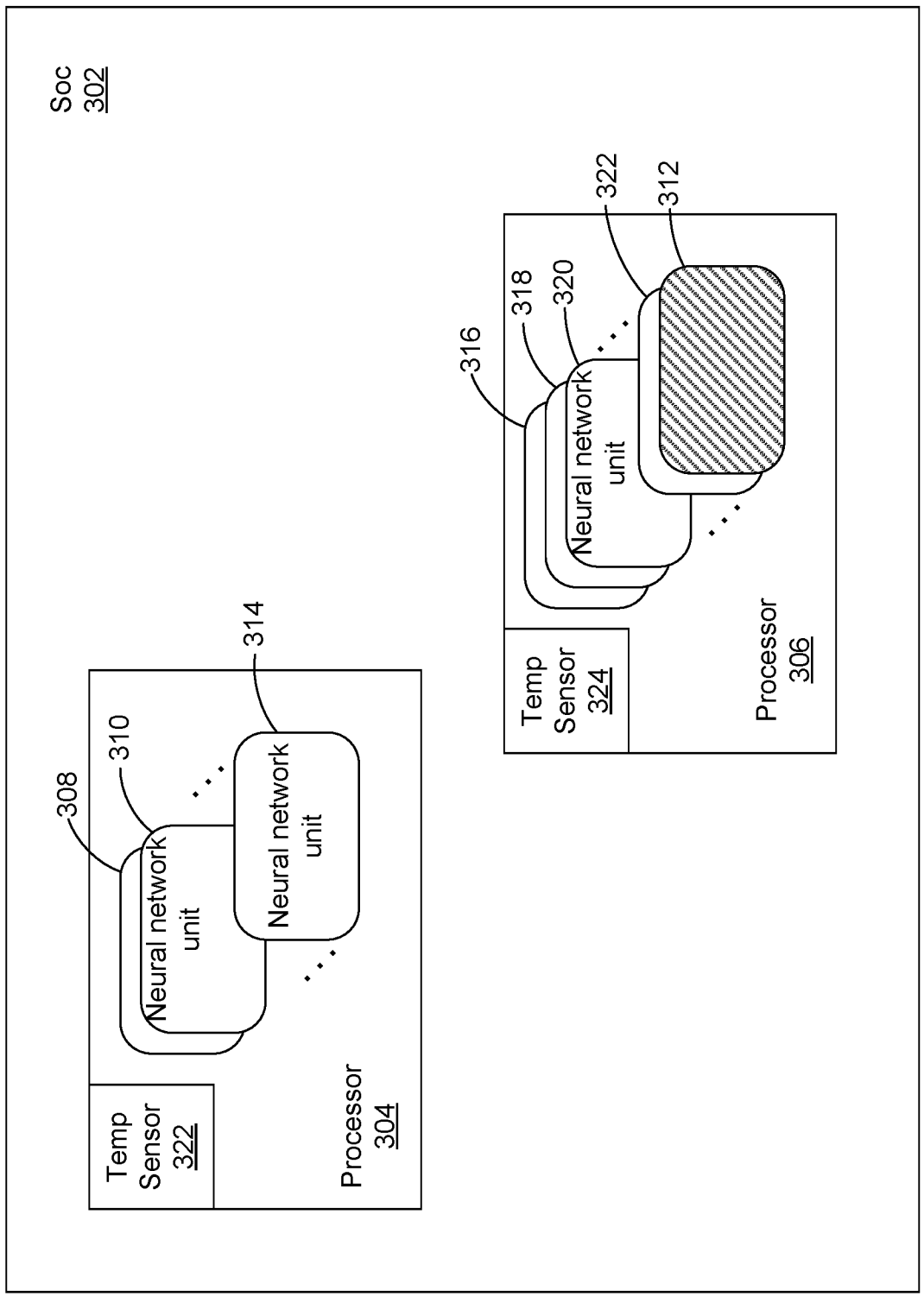
FIG. 4 is similar to FIG. 3, illustrating the SoC processors after re-allocation of the neural network unit.

FIG. 4 illustrates that, under control of the workload allocation processor 210, or the workload allocation processor 210 in coordination with other SoC components, the re-allocation may be performed. As a result of the re-allocation, the first processor 304 ceases executing the identified neural network unit 312, and the second processor 306 begins executing the identified neural network unit 312.

It should be noted that although the foregoing example involves identifying a neural network unit from among two or more neural network units executing concurrently on a processor, other examples may involve as few as a single neural network unit. That is, in an example of operation in which there is no more than one neural network unit executing, that neural network unit may be identified as a candidate for re-allocation to another processor or may not be identified as a candidate for re-allocation to another processor, based on the results of the comparisons and metadata associated with the neural network unit.

Figure 5:
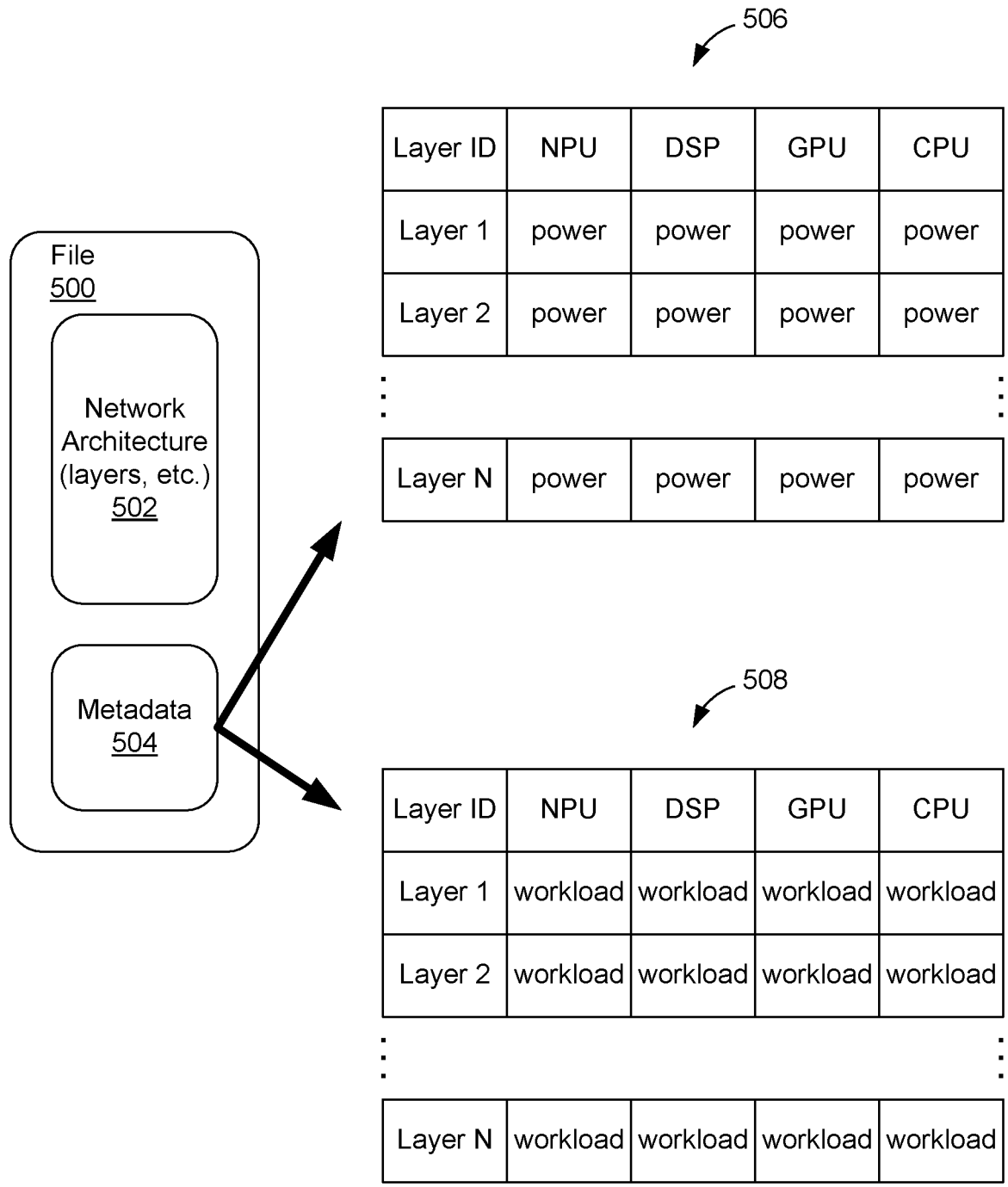
FIG. 5 illustrates a file comprising neural network software and associated metadata, in accordance with exemplary embodiments.

FIG. 5 illustrates an exemplary software file 500 that includes not only the network architecture 502 (e.g., layers, perceptrons, weights, etc.) that characterize a neural network but also metadata 504 associated with that neural network. The network architecture 502 is executable on the various SoC processors (e.g., CPU, DSP, GPU, NPU, etc.) in a conventional manner. The metadata 504 includes information that may be used to identify a layer of the neural network for re-allocation and to identify a target processor. The metadata 504 may have any form, such as a table or other data structure. In the example illustrated in FIG. 5, in which the neural network units are layers of a neural network, the metadata information is provided on a per-layer basis. Note that in an example of operation in which a plurality of neural network units may be executing concurrently, some of those neural network units may be neural networks while others may be layers of the same neural network. Stated generally, the metadata may be provided on a per-neural network unit basis.

The metadata 504 may include, for example, a power consumption table 506. The power consumption table 506 may be produced at a time prior to operation of the neural network with which it is associated. For example, the power consumption table 506 and the file 500 may be produced when the system 200 (FIG. 2) is manufactured or at another time before the system 200 is ready for end use (e.g., in an automotive environment).

The power consumption table 506 relates each neural network unit (e.g., neural network layer) with the power consumption resulting from execution of that neural network unit on each of the SoC processors. For example, to compile the power consumption table 506, a neural network unit may be executed on each SoC processor, and the resulting power consumption of that processor may be measured and stored. Such a process of executing a neural network unit, measuring the power consumption, and storing it in the table 506 may be repeated for each processor until the neural network unit has been executed on each processor. The stored power consumption level for a particular neural network unit executing on a particular SoC processor thus represents an estimate of the power that would be consumed if that particular neural network unit were later executed on that particular processor. The process may be repeated for each neural network unit. In the illustrated embodiment, in which each neural network unit is a layer of a neural network, the resulting table 506 represents the measured power consumption of each layer executing on each SoC processor, such as the NPU 204-4, DSP 204-3, GPU 204-2 and CPU 204-1 described above with regard to FIG. 2.

The metadata 504 may include, for example, a processing load table 508, either additionally to the power consumption table 506 or, in other embodiments, alternatively to the power consumption table 506. The processing load table 508 may be produced at a time prior to operation of the neural network with which it is associated. For example, the processing load table 508 and the file 500 may be produced when the system 200 (FIG. 2) is manufactured or at another time before the system 200 is ready for end use (e.g., in an automotive environment).

The processing load table 508 relates each neural network unit (e.g., neural network layer) with the processing load level resulting from execution of that neural network unit on each of the SoC processors. The term "processing load level" refers to a measurement of the workload expended by the processor to execute the neural network unit by itself, i.e., without concurrently executing any other software. Processing time or the amount of time that the processor takes to execute the neural network unit is an example of a processing load measurement. Percent utilization or the percentage of the processor's maximum processing capability that is utilized to execute the neural network unit by itself is another example of a processing load measurement. To compile the processing load table 508, a neural network unit may be executed on each SoC processor, and the resulting processing load level of that processor may be measured and stored. Such a process of executing a neural network unit, measuring the processing load level, and storing it in the table 508 may be repeated for each processor until the neural network unit has been executed on each processor. The stored processing load level for a particular neural network unit executing on a particular SoC processor thus represents an estimate of the processing load level that would result if that particular neural network unit were later executed on that particular processor. The process may be repeated for each neural network unit. In the illustrated embodiment, in which each neural network unit is a layer of a neural network, the resulting table 508 represents the measured processing load or workload of each layer executing on each SoC processor, such as the NPU 204-4, DSP 204-3, GPU 204-2 and CPU 204-1 described above with regard to FIG. 2. It may be appreciated that the foregoing tables 506 and 508 are intended only as examples, and in other examples the metadata may comprise other types of information, organized in other ways, etc.

Figure 6:
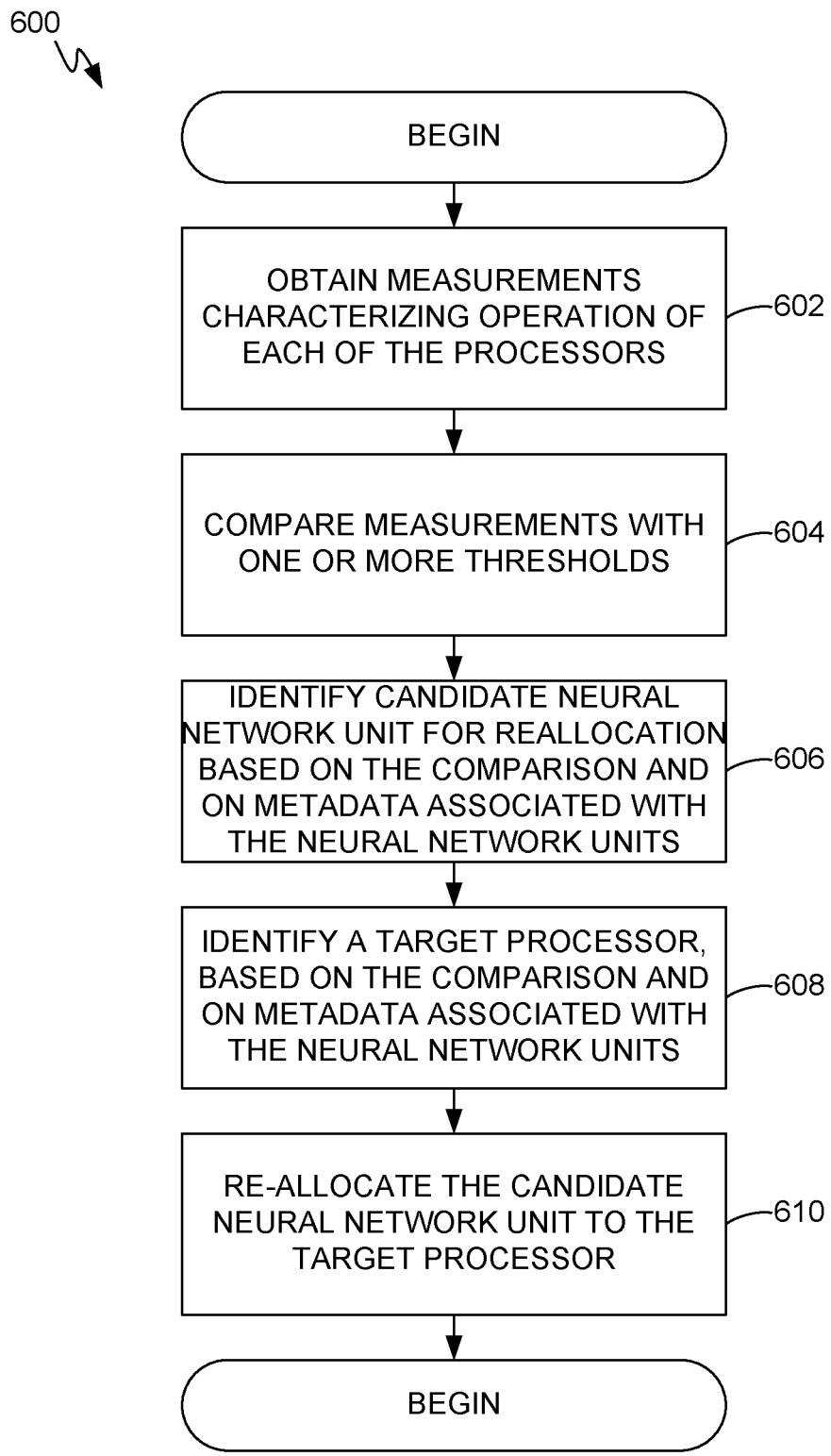
FIG. 6 is a flow diagram illustrating a method for workload re-allocation in an SoC, in accordance with exemplary embodiments.

FIG. 6 is a flow diagram illustrating a method 600 for workload re-allocation in an SoC having two or more heterogeneous processors. The method 600 may be performed, for example, under the control of the above-described workload allocation processor 210 (FIG. 2) or other SoC components that may relate to allocation of tasks or workloads among processors. The method 600 may be performed at run-time, i.e., dynamically, while the one or more neural networks or other neural network units are being executed on the SoC processors for purposes of providing end-user functionality. For example, the method 600 may be integrated with operation of a vehicle such as an automobile. It should be noted that prior to such execution, i.e., prior to run-time, metadata such as that described above with regard to a file 500 (FIG. 5) may be generated for each of the one or more neural networks. A time prior to run-time may be referred to for convenience as "offline." The workload allocation processor 210 may have access to the metadata in the files 500. The files 500 may be stored, for example, in the system memory 214 (FIG. 2) or other memory.

The method 600 may begin with obtaining a plurality of measurements that characterize an aspect of the operation of each of the corresponding plurality of SoC processors, as indicated by block 602. The aspect may be any aspect that potentially constrains or limits the operation. For example, a measurement may be a temperature characterizing the heat dissipation of a processor under its present workload (i.e., executing one or more neural network units). Alternatively, or in addition, a measurement may be a processor utilization percentage or processing time that characterizes a processor's present workload. Still another example of a measurement may be peak power drawn by a processor.

As indicated by block 604, the measurements may be compared with one or more thresholds. For example, an SoC processor associated with each measurement may be categorized as corresponding to a measurement above a threshold or below a threshold.

As indicated by block 606, a neural network unit executing on one of the SoC processors may be identified as a candidate for re-allocation to another SoC processor, based on results of the comparisons (block 604) and on metadata associated with the neural network unit. For example, reallocating a neural network unit from execution on a processor associated with a measurement that exceeds a threshold (block 604) to a processor associated with a measurement that is significantly lower, may help distribute the workloads in a manner that promotes higher performance and/or less localized thermal energy dissipation.

As indicated by block 608, a target processor may be identified, based on results of the comparisons (block 604) and on the metadata associated with the identified or candidate neural network unit. For example, a processor that is not associated with a high temperature measurement or that can accommodate execution of the candidate neural network unit without becoming overloaded may be a good target.

As indicated by block 610, the candidate neural network unit may then be re-allocated or migrated to the target processor. That is, the neural network unit ceases to execute on the processor on which it had been executing, and resumes executing on the target processor.

Figure 7A:
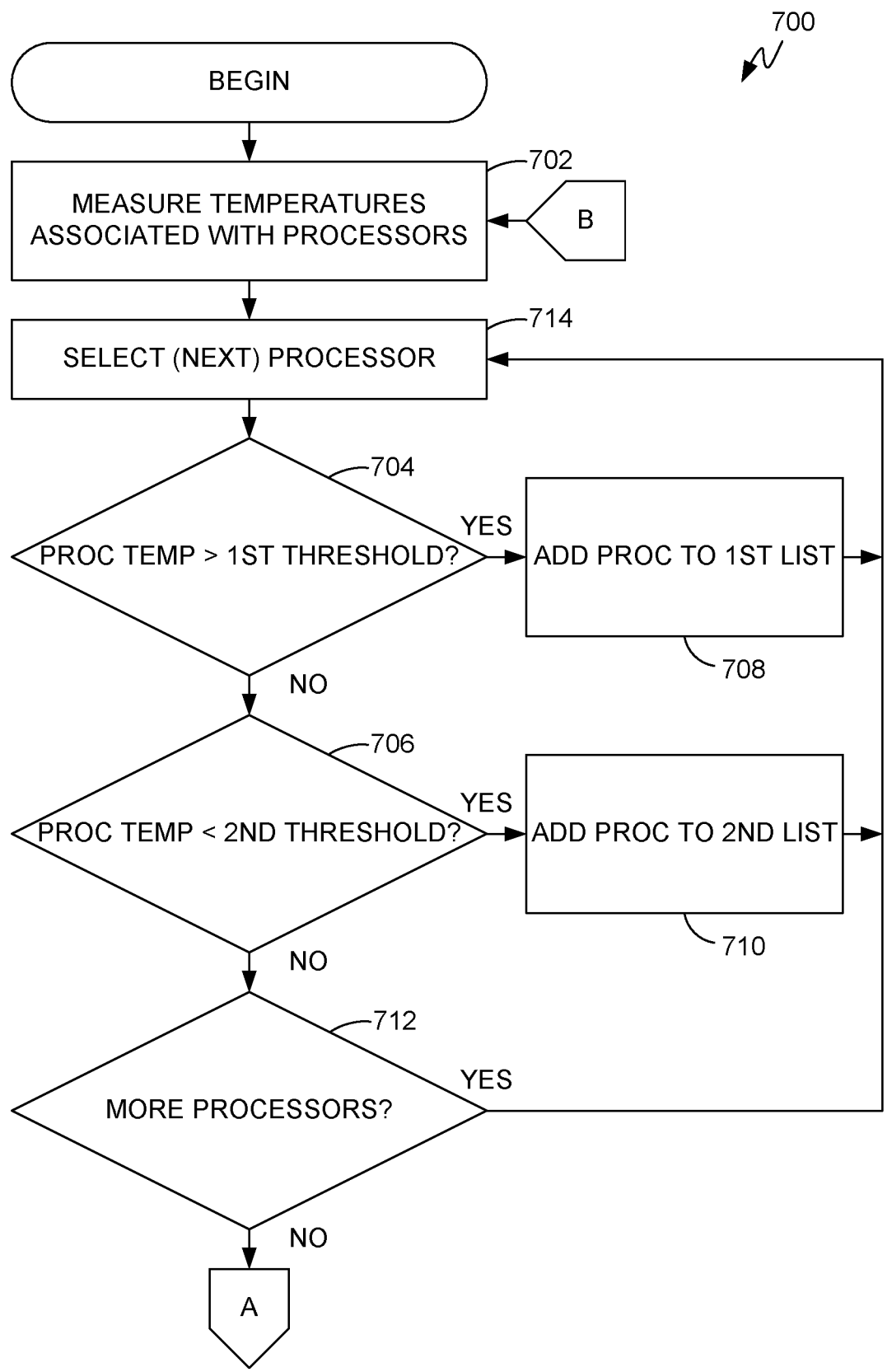
FIG. 7A is a flow diagram illustrating another method for workload re-allocation in an SoC, in accordance with exemplary embodiments.
Figure 7B:
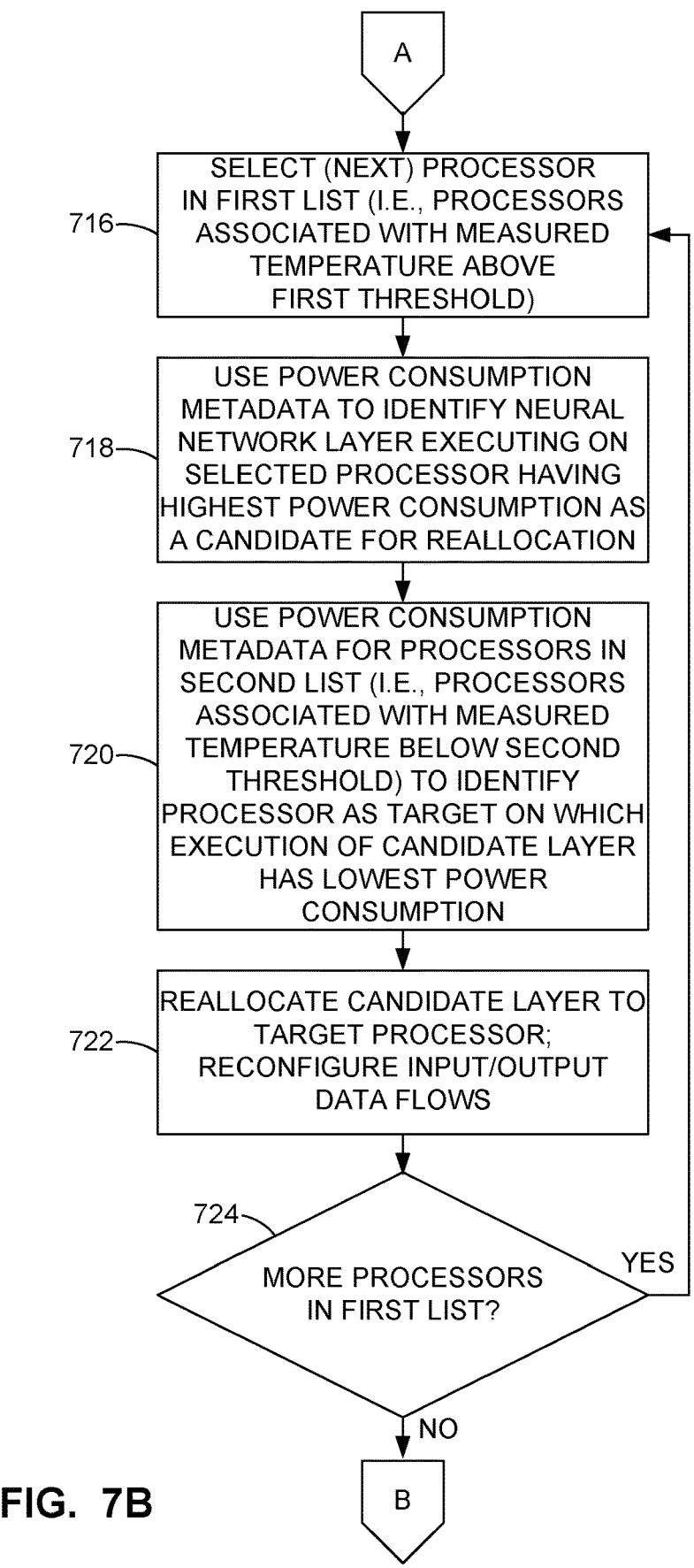
FIG. 7B is a continuation of the flow diagram of FIG. 7A.

FIGS. 7A-7B are a flow diagram illustrating a method 700 for workload re-allocation and thermal energy mitigation in an SoC having two or more heterogeneous processors. The method 700 may be an example of the above-described method 600 (FIG. 6).

The method 700 may begin with obtaining temperature measurements associated with each of the SoC processors, as indicated by block 702. For example, the above-described workload allocation processor 210 (FIG. 2) may receive temperature measurements from temperature sensors 212 that are thermally coupled to the SoC processors. It should be noted that the SoC processors referred to with reference to the method 700 are those heterogeneous processors (e.g., NPU, DSP, GPU, CPU, etc.) that are executing one or more of the above-described neural network units, such as layers of one or more neural networks.

As indicated by blocks 704 and 706, the measured temperature associated with each SoC processor may be compared with first and second thresholds, respectively. For example, the measured temperature associated with each SoC processor may be compared with a first threshold (block 704) representing a temperature above which undesirable effects of excess thermal energy dissipation are estimated to be more likely to occur. Information identifying any processors having temperatures exceeding the first threshold may be added to a first list, as indicated by block 708. The measured temperature associated with each SoC processor also may be compared with a second threshold (block 706) representing a temperature below which undesirable effects of excess thermal energy dissipation are estimated to be less likely to occur. Information identifying any processors having temperatures below the second threshold may be added to a second list, as indicated by block 710. In such an example, involving two thresholds, the method 700 may dynamically re-allocate the executing neural network layers or other neural network units among the various SoC processors in a manner that tends to maintain the processors at temperatures between the first (higher) and second (lower) thresholds.

As indicated by the loop between blocks 712 and 714, the method 700 may include iteratively performing the above-described comparisons and categorizations (blocks 704-710), selecting the next processor (block 714) and determining if there are more processors that have not yet been selected (block 712), until all processors have been the subject of the above-described categorization of measured processor temperatures. Following block 712, the method 700 continues at block 716 (FIG. 7B). Block 716 indicates selecting a processor in the first list (i.e., a processor associated with a measured temperature exceeding the first threshold).

As indicated by block 718, one of the neural network units executing on the selected processor in the first list may be identified as a candidate for re-allocation, based on power consumption metadata associated with the neural network units executing on that processor. For example, the power consumption metadata associated with the neural network units executing on the selected processor may indicate that one of the neural network units executing on that processor consumes more power than the other neural network units executing on that processor. The table 506 (FIG. 5) may be used to compare the estimated power consumption levels of all neural network units executing on that processor with each other, and the neural network unit that the table 506 indicates as having the highest estimated power consumption level when executing on that processor may be selected as a candidate for re-allocation.

As indicated by block 720, a target processor may be identified, based on power consumption metadata associated with the one or more processors in the second list (i.e., processors associated with measured temperatures below the second threshold). Although not shown for purposes of clarity in the method 700, if there are no processors in the second list, re-allocation of the candidate neural network unit may be bypassed or delayed until such time as there is at least one processor in the second list (as may be determined during a further iteration of the method 700). The table 506 (FIG. 5) may be used to compare with each other the estimated power consumption levels of the selected neural network unit if it were executed on each of the processors in the second list, and the processor in the second list that the table 506 indicates as having the lowest estimated power consumption level when executing the selected neural network unit may be selected as the target processor.

As indicated by block 722, the candidate neural network unit is then re-allocated or migrated to the target processor. In embodiments in which the neural network unit is a neural network layer, the input and output data flows among layers of the same neural network may be reconfigured accordingly. Thus, a layer may continue to receive input data that another layer produces as output data, regardless of on which processors the layers are executed.

As indicated by the loop between blocks 724 and 716, the method 700 may include iteratively performing the steps described above with regard to blocks 718-722, selecting the next processor (if any) in the first list (block 716) and determining if there are more processors in the first list that have not yet been selected (block 724), until all processors in the first list have been the subject of the steps described above with regard to blocks 718-722. Following block 724, the method 700 may be repeated, beginning at block 702 (FIG. 7A). The method 700 may be repeated at time intervals on a continuous basis while the neural networks are operating.

Figure 8A:
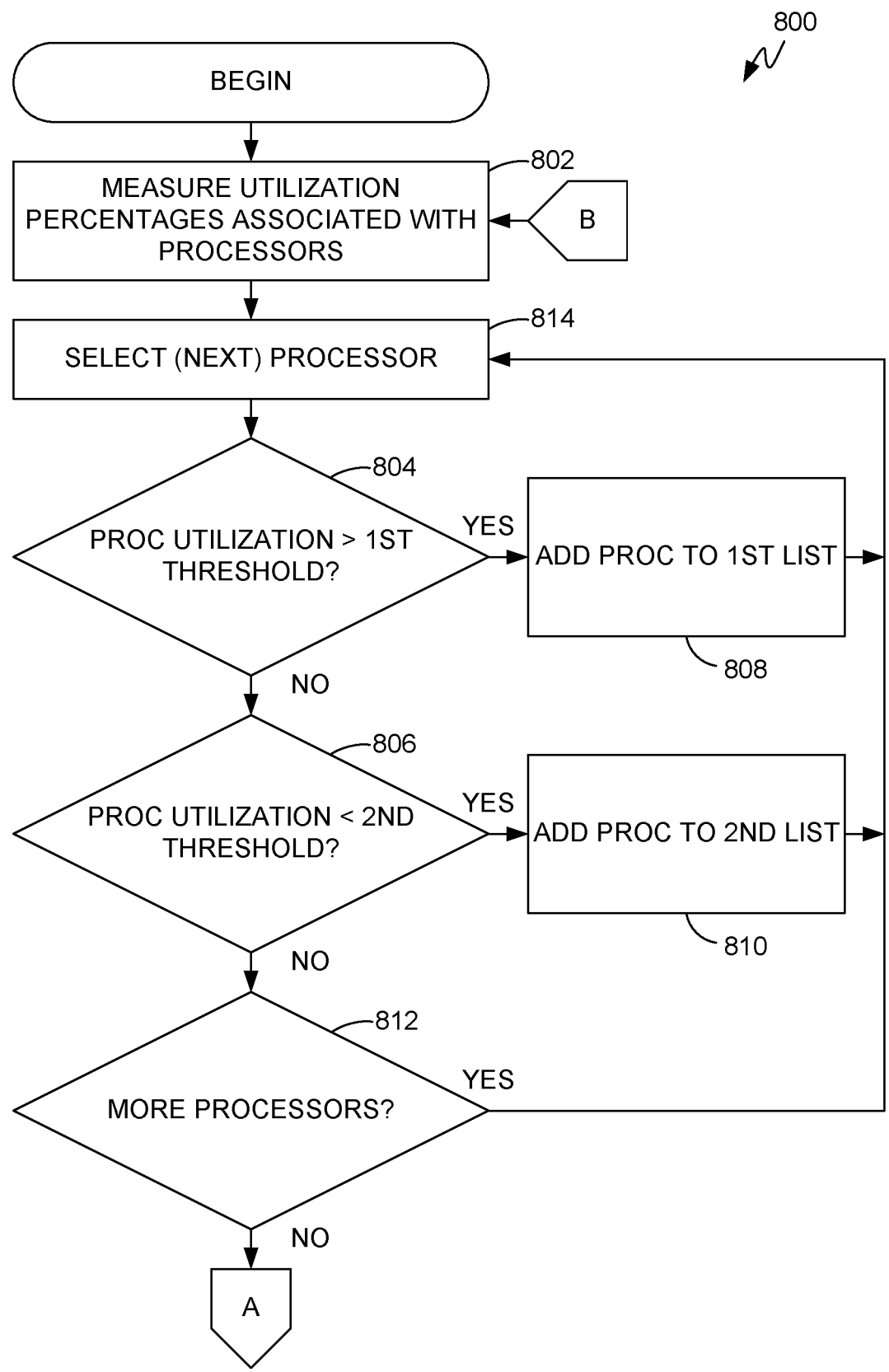
FIG. 8A is a flow diagram illustrating yet another method for workload re-allocation in an SoC, in accordance with exemplary embodiments.
Figure 8B:
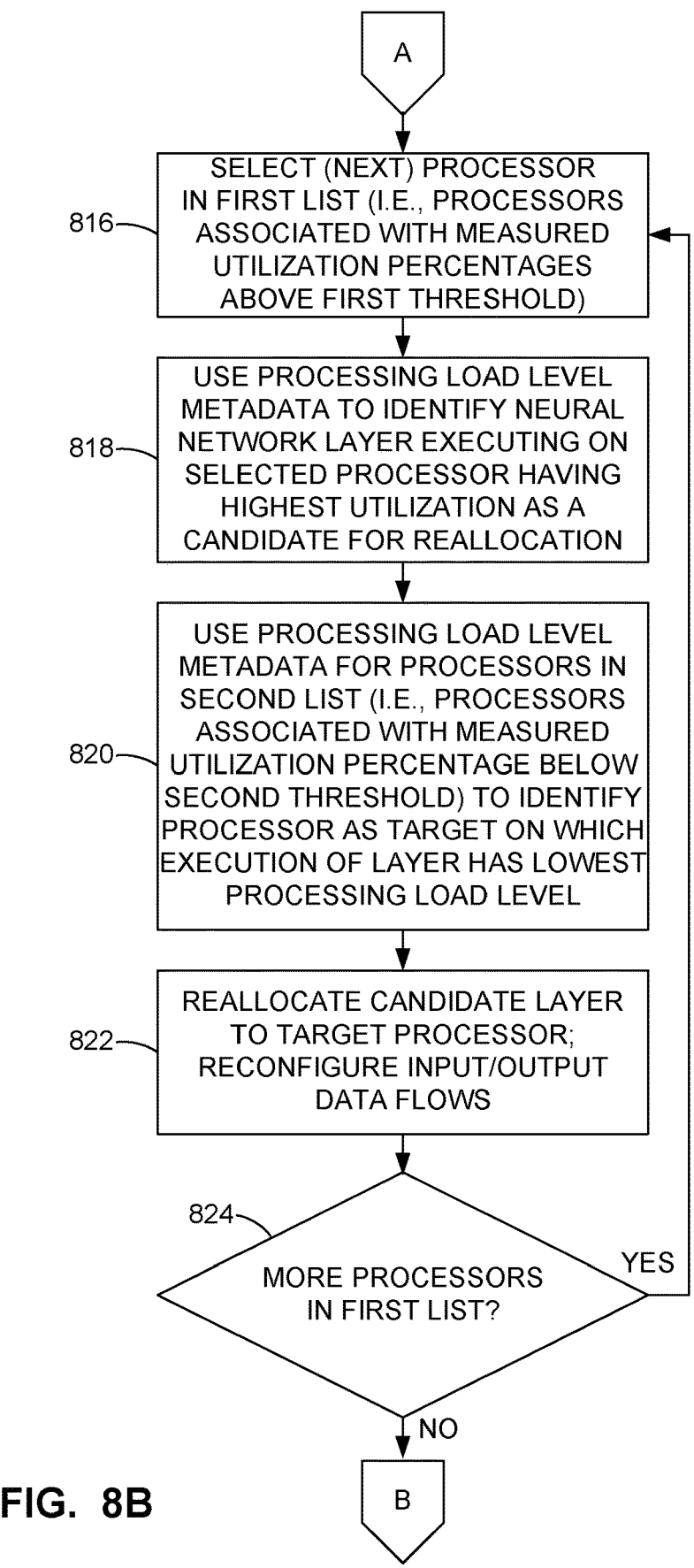
FIG. 8B is a continuation of the flow diagram of FIG. 8A.

FIGS. 8A-8B are a flow diagram illustrating a method 800 for workload re-allocation and performance management in an SoC having two or more heterogeneous processors. The method 800 may be an example of the above-described method 600 (FIG. 6).

The method 800 may begin with obtaining utilization measurements associated with each of the SoC processors, as indicated by block 802. As understood by one of ordinary skill in the art, in response to a request (e.g., from the workload allocation processor 210), a processor may provide a value or measurement representing the percentage of the processor's maximum processing capacity being utilized at the time of the request. Some neural network units may load a processor more than others. A processor's utilization percentage thus may depend not only on the number of neural network units executing concurrently on the processor but also on the total amount of processing power demanded by the concurrently executing neural network units. A processor that is operating at full capacity, i.e., 100 percent utilization, is incapable of executing additional neural network units without reducing performance, while a processor that is operating at much less than 100 percent utilization may be capable of executing additional neural network units without substantially reducing performance. It should be noted that the SoC processors referred to with reference to the method 800 are those heterogeneous processors (e.g., NPU, DSP, GPU, CPU, etc.) that are executing one or more of the above-described neural network units, such as layers of one or more neural networks.

As indicated by blocks 804 and 806, the measured utilization percentages associated with each SoC processor may be compared with first and second thresholds, respectively. For example, the measured utilization percentage associated with each SoC processor may be compared with a first threshold (block 804) representing a utilization percentage above which the processor is unlikely to be able to execute additional neural network units without reducing performance. Information identifying any processors having utilization percentages exceeding the first threshold may be added to a first list, as indicated by block 808. The utilization percentage associated with each SoC processor also may be compared with a second threshold (block 806) representing a utilization percentage below which the processor is likely to be able to execute additional neural network units without reducing performance. Information identifying any processors having utilization percentages below the second threshold may be added to a second list, as indicated by block 808. In such an example, involving two thresholds, the method 800 may dynamically re-allocate the executing neural network layers or other neural network units among the various SoC processors in a manner that tends to maintain the processors at utilization percentages between the first and second thresholds.

As indicated by the loop between blocks 812 and 814, the method 800 may include iteratively performing the above-described comparisons and categorizations (blocks 804-810), selecting the next processor (block 814) and determining if there are more processors that have not yet been selected (block 812), until all processors have been the subject of the above-described categorization of measured processor utilizations. Following block 812, the method 800 continues at block 816 (FIG. 8B). Block 816 indicates selecting a processor in the first list (i.e., a processor associated with a utilization percentage exceeding the first threshold).

As indicated by block 818, one of the neural network units executing on the selected processor in the first list may be identified as a candidate for re-allocation, based on processing load level metadata associated with the neural network units executing on that processor. For example, the processing load level metadata associated with the neural network units executing on the selected processor may indicate that one of the neural network units executing on that processor imposes a greater load on that processor than the other neural network units executing on that processor. The table 508 (FIG. 5) may be used to compare the estimated processing load levels of all neural network units executing on that processor with each other, and the neural network unit that the table 508 indicates as having the highest estimated processing load level when executing on that processor may be selected as a candidate for re-allocation.

As indicated by block 820, a target processor may be identified, based on processing load level metadata associated with the one or more processors in the second list (i.e., processors associated with measured utilization percentages lower than the second threshold). Although not shown for purposes of clarity in the method 800, if there are no processors in the second list, re-allocation of the candidate neural network unit may be bypassed or delayed until such time as there is at least one processor in the second list (as may be determined during a further iteration of the method 800). The table 508 (FIG. 5) may be used to compare with each other the estimated processing load levels of the selected neural network unit if it were executed on each of the processors in the second list, and the processor in the second list that the table 508 indicates as having the lowest estimated processing load level when executing the selected neural network unit may be selected as the target processor.

As indicated by block 822, the candidate neural network unit is then re-allocated to the target processor. In embodiments in which the neural network unit is a neural network layer, the input and output data flows among layers of the same neural network may be reconfigured accordingly. Thus, a layer may continue to receive input data that another layer produces as output data, regardless of on which processors the layers are executed.

As indicated by the loop between blocks 824 and 816, the method 800 may include iteratively performing the above-described steps (blocks 818-822), selecting the next processor (if any) in the first list (block 816) and determining if there are more processors in the first list that have not yet been selected (block 824), until all processors in the first list have been the subject of the above-described steps (blocks 818-822). Following block 824, the method 800 may be repeated, beginning at block 802 (FIG. 8A). The method 800 may be repeated at time intervals on a continuous basis while the neural networks are operating.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for workload re-allocation in a system-on-a-chip ("SoC") having a plurality of heterogeneous processors, comprising:
   obtaining, by a workload allocation control processor, a plurality of measurements, each characterizing operation of a corresponding SoC processor;
   comparing, by the workload allocation control processor, each of the measurements with one or more thresholds;
   identifying, by the workload allocation control processor, a neural network unit executing on one of the SoC processors based on metadata associated with the neural network unit and based on a result of a comparison of the measurements with the one or more thresholds, wherein the metadata comprises a data structure listing one or more layers of a neural network and listing each SoC processor and its performance for a particular neural network layer, the performance of each SoC for a particular neural network layer comprises a value for at least one of power consumption and a processing load level assigned to an individual SoC processor;
   identifying, by the workload allocation control processor, a target processor based on the metadata associated with the neural network unit and based on the result of the comparison; and
   migrating, by the workload allocation control processor, the neural network unit from the one of the processors to the target processor.

2. The method of claim 1, wherein identifying a neural network unit comprises identifying the neural network unit from among a plurality of neural network units concurrently executing on the one of the SoC processors.

3. The method of claim 2, wherein the neural network unit comprises a neural network layer or a neural network of one or more neural networks, each having a plurality of layers concurrently executing on the plurality of SoC processors.

4. The method of claim 3, wherein:
   the metadata is contained in an input file having neural network information; and
   the measurements comprise temperatures associated with execution of the plurality of neural network units on each of the plurality of SoC processors.

5. The method of claim 4, wherein identifying the neural network unit from among a plurality of neural network units concurrently executing on the one of the SoC processors comprises identifying the neural network unit indicated by the metadata as having a highest power consumption of all neural network units executing on the one of the SoC processors.

6. The method of claim 4, wherein identifying a target processor comprises identifying the SoC processor indicated by the metadata as executing the identified neural network unit at a lowest power consumption of all processors.

7. The method of claim 3, wherein:
   the metadata is contained in an input file having neural network information; and
   the measurements comprise processor utilization associated with execution of the plurality of neural network units on each of the SoC processors.

8. The method of claim 7, wherein identifying the neural network unit from among a plurality of neural network units concurrently executing on the one of the SoC processors comprises identifying the neural network unit indicated by the metadata as having a highest processing load of all neural network units executing on the one of the SoC processors.

9. The method of claim 7, wherein identifying a target processor comprises identifying the processor indicated by the metadata as executing the identified neural network unit at a lowest processing load of all processors.

10. A system for workload re-allocation in a system-on-a-chip ("SoC"), comprising:
- a plurality of heterogeneous SoC processors; and
- a workload allocation control processor configured to:
  - obtain a plurality of measurements, each characterizing operation of a corresponding SoC processor;
  - compare each of the measurements with one or more thresholds;
  - identify a neural network unit executing on one of the SoC processors based on metadata associated with the neural network unit and based on a result of a comparison of the measurements with the one or more thresholds, wherein the metadata comprises a data structure listing one or more layers of a neural network and listing each SoC processor and its performance for a particular neural network layer, the performance of each SoC for a particular neural network layer comprises a value for at least one of power consumption and a processing load level assigned to an individual SoC processor;
  - identify a target processor based on the metadata associated with the neural network unit and based on the result of the comparison; and
  - migrate the neural network unit from the one of the processors to the target processor.

11. The system of claim 10, wherein the workload allocation control processor is configured to identify a neural network unit by identifying the neural network unit from among a plurality of neural network units concurrently executing on the one of the SoC processors.

12. The system of claim 11, wherein the neural network unit comprises a neural network layer of one or more neural networks, each having a plurality of layers concurrently executing on the plurality of SoC processors.

13. The system of claim 12, wherein:
- the metadata is contained in an input file having neural network information; and
- the measurements comprise temperatures associated with execution of the plurality of neural network units on each of the plurality of SoC processors.

14. The system of claim 13, wherein the workload allocation control processor is configured to identify the neural network unit from among a plurality of neural network units concurrently executing on the one of the SoC processors by identifying the neural network unit indicated by the metadata as having a highest power consumption of all neural network units executing on the one of the SoC processors.

15. The system of claim 13, wherein the workload allocation control processor is configured to identify a target processor by identifying the SoC processor indicated by the metadata as executing the identified neural network unit at a lowest power consumption of all processors.

16. The system of claim 12, wherein:
- the measurements comprise processor utilization associated with execution of the plurality of neural network units on each of the SoC processors.

17. The system of claim 16, wherein the workload allocation control processor is configured to identify the neural network unit from among a plurality of neural network units concurrently executing on the one of the SoC processors by identifying the neural network unit indicated by the metadata as having a highest processing load of all neural network units executing on the one of the SoC processors.

18. The system of claim 16, wherein the workload allocation control processor is configured to identify a target processor by identifying the processor indicated by the metadata as executing the identified neural network unit at a lowest processing load of all processors.

19. A system for workload re-allocation in a system-on-a-chip ("SoC"), comprising:
- means for obtaining a plurality of measurements, each characterizing operation of a corresponding SoC processor;
- means for comparing each of the measurements with one or more thresholds;
- means for identifying, by the workload allocation control processor, a neural network unit executing on one of the SoC processors based on metadata associated with the neural network unit and based on a result of a comparison of the measurements with the one or more thresholds, wherein the metadata comprises a data structure listing one or more layers of a neural network and listing each SoC processor and its performance for a particular neural network layer, the performance of each SoC for a particular neural network layer comprises a value for at least one of power consumption and a processing load level assigned to an individual SoC processor;
- means for identifying a target processor based on the metadata associated with the neural network unit and based on the result of the comparison; and
- means for migrating the neural network unit from the one of the processors to the target processor.

20. The system of claim 19, wherein the means for identifying a neural network unit comprises means for identifying the neural network unit from among a plurality of neural network units concurrently executing on the one of the SoC processors.

21. The system of claim 20, wherein the neural network unit comprises a neural network layer of one or more neural networks, each having a plurality of layers concurrently executing on the plurality of SoC processors.

22. The system of claim 21, wherein:
- the metadata is contained in an input file having neural network information; and
- the measurements comprise temperatures associated with execution of the plurality of neural network units on each of the plurality of SoC processors.

23. The system of claim 22, wherein the means for identifying the neural network unit from among a plurality of neural network units concurrently executing on the one of the SoC processors comprises means for identifying the neural network unit indicated by the metadata as having a highest power consumption of all neural network units executing on the one of the SoC processors.

24. The system of claim 22, wherein the means for identifying a target processor comprises means for identifying the SoC processor indicated by the metadata as executing the identified neural network unit at a lowest power consumption of all processors.

25. The system of claim 21, wherein:
- the metadata is contained in an input file having neural network information; and
- the measurements comprise processor utilization associated with execution of the plurality of neural network units on each of the SoC processors.

26. The system of claim 25, wherein identifying the neural network unit from among a plurality of neural network units concurrently executing on the one of the SoC processors comprises identifying the neural network unit indicated by the metadata as having a highest processing load of all neural network units executing on the one of the SoC processors.

27. The system of claim 25, wherein identifying a target processor comprises identifying the processor indicated by the metadata as executing the identified neural network unit at a lowest processing load of all processors.

28. A computer program product for workload re-allocation in a system-on-a-chip ("SoC"), the computer program product comprising a non-transitory computer-readable medium having stored thereon in computer-executable form instructions executable on a processor system to:
  obtain a plurality of measurements, each characterizing operation of a corresponding SoC processor;
  compare each of the measurements with one or more thresholds;
  identify a neural network unit executing on one of the SoC processors based on metadata associated with the neural network unit and based on a result of a comparison of the measurements with the one or more thresholds, wherein the metadata comprises a data structure listing one or more layers of a neural network and listing each SoC processor and its performance for a particular neural network layer, the performance of each SoC for a particular neural network layer comprises a value for at least one of power consumption and a processing load level assigned to an individual SoC processor;
  identify a target processor based on the metadata associated with the neural network unit and based on the result of the comparison; and
  migrate the neural network unit from the one of the processors to the target processor.

29. The computer program product of claim 28, wherein the instructions executable on the processor system to identify a neural network unit comprise instructions executable on the processor system to identify the neural network unit from among a plurality of neural network units concurrently executing on the one of the SoC processors.

30. The computer program product of claim 29, wherein the neural network unit comprises a neural network layer of one or more neural networks, each having a plurality of layers concurrently executing on the plurality of SoC processors.

* * * * *